United States Patent
Parikh (10) Patent No.: US 9,983,966 B2
(45) Date of Patent: May 29, 2018

(54) DETECTING DEGRADED CORE PERFORMANCE IN MULTICORE PROCESSORS

(71) Applicant: Oracle International Corporation, Redwood City, CA (US)

(72) Inventor: Alok Parikh, Mumbai (IN)

(73) Assignee: Oracle International Corporation, Redwood Shores, CA (US)

(*) Notice: Subject to any disclaimer, the term of this patent is extended or adjusted under 35 U.S.C. 154(b) by 66 days.

(21) Appl. No.: 14/953,491

(22) Filed: Nov. 30, 2015

(65) Prior Publication Data
US 2017/0153958 A1  Jun. 1, 2017

(51) Int. Cl.
*G06F 11/00* (2006.01)
*G06F 11/263* (2006.01)
*G06F 11/22* (2006.01)

(52) U.S. Cl.
CPC ........ *G06F 11/263* (2013.01); *G06F 11/2242* (2013.01)

(58) Field of Classification Search
CPC ..................................................... G06F 11/263
USPC .................. 714/37, 45, 39, 40, 47.1, 54
See application file for complete search history.

(56) References Cited

U.S. PATENT DOCUMENTS

| | | | |
|---|---|---|---|
| 6,134,675 A | 10/2000 | Raina | |
| 7,774,657 B1* | 8/2010 | Hardman | G06F 11/2247 714/33 |
| 7,796,061 B2* | 9/2010 | Kee | G06F 9/5077 341/50 |
| 8,949,663 B2 | 2/2015 | Ueda | |
| 9,032,256 B2 | 5/2015 | Douskey et al. | |
| 2003/0005380 A1 | 1/2003 | Nguyen | |
| 2009/0089636 A1* | 4/2009 | Fernsler | G06F 11/2242 714/728 |
| 2011/0271161 A1* | 11/2011 | Kursun | G06F 11/24 714/736 |
| 2015/0046685 A1* | 2/2015 | Park | G06F 1/3243 712/220 |
| 2015/0169382 A1* | 6/2015 | Anderson | G06F 9/5094 718/104 |

* cited by examiner

*Primary Examiner* — Dieu-Minh Le
(74) *Attorney, Agent, or Firm* — Meyertons, Hood, Kivlin, Kowert & Goetzel, P.C.

(57) ABSTRACT

An embodiment of a system is disclosed, including an interface configured to communicate to a device under test (DUT). The DUT may include a plurality of processor cores. The system also includes a testing apparatus configured to concurrently measure a performance of a portion of each processor core to generate a first set of test values. Each test value of the first set may correspond to a given processor core of the plurality of processor cores. The testing apparatus may also be configured to analyze the first set of test values, and reject the DUT in response to a determination that at least one test value of the first set of test values exceeds a first threshold.

20 Claims, 7 Drawing Sheets

DETECTING DEGRADED CORE PERFORMANCE IN MULTICORE PROCESSORS

BACKGROUND

Field of the Invention

The embodiments herein relate to the performance of integrated circuits and, more particularly, to determining the performance of processor cores in multiple core processors.

Description of the Related Art

The performance of high-end integrated circuits (ICs), such as, for example, microprocessors, has increased over the years and continues to increase when looking at IC designs for the future. Generally speaking, the performance boost of microprocessors may be associated with features such as, for example, higher clock frequencies (i.e., shorter clock periods) allowing more instructions to be executed in a given period of time, multiple cores for executing various processes concurrently, and multi-threaded cores that allow a given core to utilize its resources more efficiently.

In a homogeneous multiple core processor (commonly referred to as a "multicore processor"), the multiple cores may share a similar design. Accordingly, each core may be expected to have a similar level of performance as the other cores in the processor. If multiple cores are expected to perform similarly, yet one or more of these cores perform significantly different from the other cores, then the processor may have one or more defects, and may require repairs, replacement, or a redesign.

SUMMARY

Various embodiments of systems and methods for determining performance of processing cores are disclosed. An embodiment of a system includes a testing apparatus and an interface configured to communicate to a device under test (DUT), which includes a plurality of processor cores. The testing apparatus may be configured to concurrently measure a performance of a portion of each processor core to generate a first set of test values. Each test value of the first set may correspond to a given processor core of the plurality of processor cores. The testing apparatus may also be configured to analyze the first set of test values, and to reject the DUT in response to a determination that at least one test value exceeds a first threshold.

In a further embodiment, each processor core of the plurality of processor cores may include a plurality of execution circuits. The portion of each processor core may include a respective execution circuit of the plurality of execution circuits. In another embodiment, to concurrently measure the performance of the portion of each processor core, the testing apparatus may be further configured to concurrently measure the performance of at least two execution circuits in a respective processor core.

In another embodiment, the testing apparatus may be further configured to sequentially measure the performance of the portion of each processor core to generate a second set of test values, and to analyze the second set of test values. The testing apparatus may also be configured to reject the DUT in response to a determination that at least one test value of the second set of test values exceeds a second threshold.

In one embodiment, to analyze the first set of test values, the testing apparatus may be further configured to compare each test value of the first set of test values to other test values of the first set of test values. In another embodiment, the testing apparatus may be further configured to determine the first threshold dependent upon a mean value and a standard deviation value for the first set of test values. In a further embodiment, at least one of the first set of test values may be dependent upon a temperature of a corresponding processor core.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Generally speaking, a microprocessor (also referred to as a "processor," a "microprocessing unit," or "MPU") may include one or more processor cores on a single integrated circuit (IC). A processor core (or simply, a "core") may refer to a unit of a microprocessor that is capable of executing program instructions and processing data independently of other processor cores within the microprocessor, such that multiple cores may execute instructions concurrently. Performance of a given core may be measured in terms of several criteria, including, but not limited to, core clock frequency, core power consumption, and core temperature. Performance may also be determined in terms of a number of floating point and/or integer operations executed, or an amount of data access bandwidth used, in completing a given task.

After manufacturing, a given core in a processor IC may be evaluated, characterized, or tested in order to determine a performance capability of the given core. Such evaluation, characterization, and testing may include executing a series of instructions in the core and during the execution, monitoring a frequency of a core clock signal, a number of elapsed core clock cycles, or measuring the rate of instructions executed, in order to determine a performance value related to the series of instructions. This performance value may be used as a basis for determining if the given core is defective or not, or to compare the performance of the given core to design targets, or to compare the given core's performance to the performance of other types of cores.

In a multicore microprocessor, in which two, four, or even 32 or more cores may be included, performance measurements for the cores may vary within a predictable or desired range of an average across all cores. A core whose measurements deviate from the average by more than the predictable range may include a defect or may be operating in a sub-optimal configuration. Defects may be a result of various causes, such as, for example, a design flaw, a manufacturing anomaly, damage from physical or electrical stress, wear and tear due to use over time. Degraded performance may be attributed to sub-optimal configuration settings. For example, a given core should operate using a frequency value of X, but is erroneously configured to operate at X/2. In another example a given core is programmed incorrectly to slow down once its temperature reaches 80° C., instead of a desired 90° C.

Evaluations and characterizations may be utilized to provide data on variations in performance due to process technology used during manufacturing. For example, if two independent manufacturing vendors produce a given processor, and these two processors are put in a same system, the disclosed embodiments may help to identify any performance differences between the two processors. Use of the disclosed embodiments may help to indicate if a manufacturing process is related to a variation in performance. To detect device defects, sub-optimal configurations, or manufacturing process impacts, one or more software processes may be executed on each core to exercise as much of each core's circuits as possible. Performance parameters may be determined for each software process to generate a resulting test value for each core. The test values may be compared and a lower performing core thereby identified. These tests however, may not provide a level of granularity within a core to determine a subsystem or circuit within a defective core causing the underperformance.

Embodiments disclosed herein may provide a capability to measure performance of circuits within each core of a multicore processor. The disclosed embodiments may teach methods for measuring performance of subsystems in each core under various operating conditions.

Figure 1:
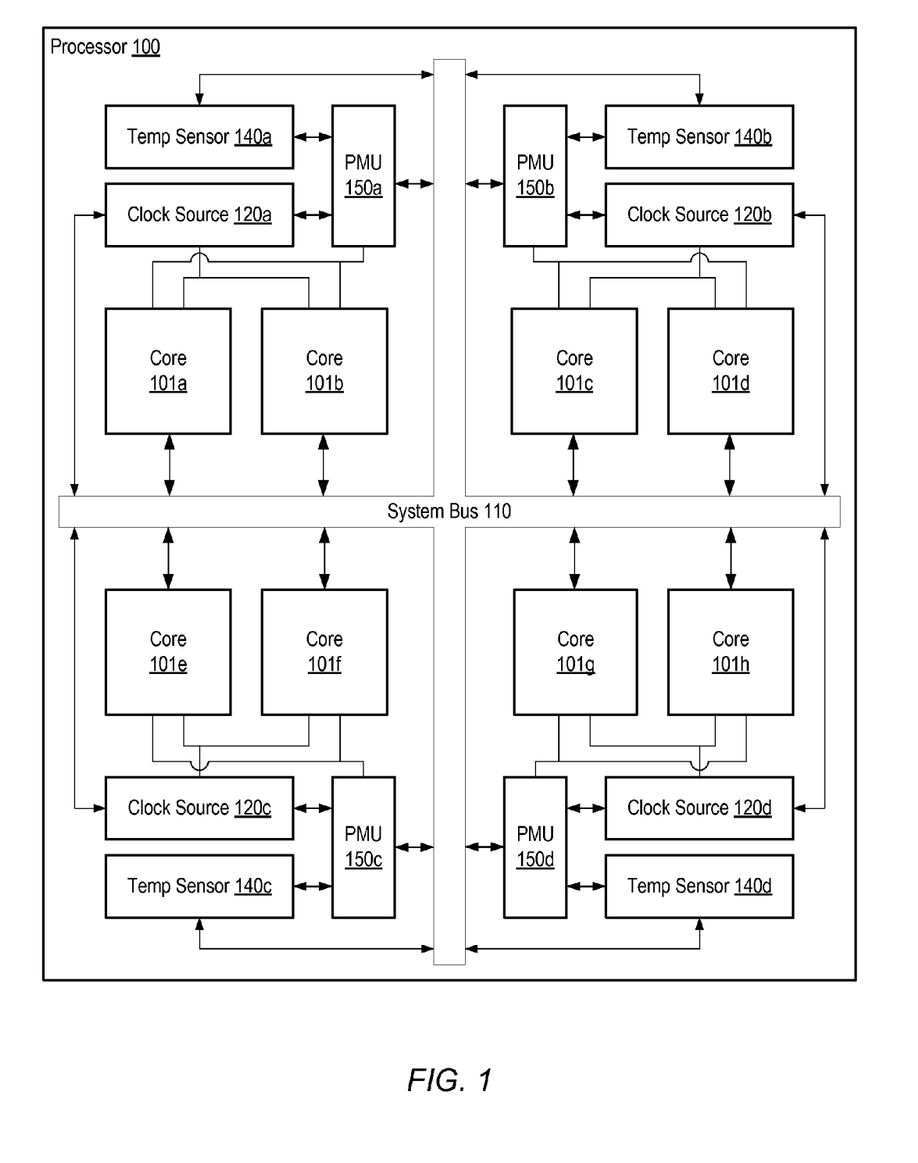
FIG. 1 is a block diagram illustrating an embodiment of a multicore processor.

In various embodiments, a multicore processor may include a number of instances of a core, as well as other features. One example of an eight core processor is depicted in FIG. 1. In the illustrated embodiment, processor 100 includes eight instances of a core, denoted as cores 101*a-h*. Cores 101*a-h* are each coupled to system bus 110. Four clock sources, denoted as clock sources 120*a-d*, and four power management units, denoted as PMU 150*a-d*, are each coupled to corresponding pairs of cores 101*a-h*. Each PMU 150*a-d* is also coupled to a respective temperature sensing unit, denoted as temp sensor 140*a-d*.

Cores 101*a-h* are configured to execute instructions and to process data according to a particular Instruction Set Architecture (ISA). In the present embodiment, cores 101*a-h* are configured to implement the SPARC® V9 ISA, although in other embodiments it is contemplated that any desired ISA may be employed, such as x86, ARM®, PowerPC® or MIPS®, for example. Additionally, as described in greater detail below, in the illustrated embodiment, each instance of core 101*a-h* is configured to execute multiple threads concurrently (referred to herein as "multi-threaded operation"), where each thread may include a set of instructions that may execute independently of instructions from another thread. In various embodiments, it is contemplated that any suitable number of cores 101*a-h* may be included within a processor, and that cores 101*a-h* may each concurrently process some number of threads.

Each of cores 101*a-h* may include multiple subsystems for executing various instructions. In the illustrated embodiment, to support multiple threads, each core includes additional circuits and buffers for managing each active thread. A sequencing unit in each core determines to which thread each instruction belongs and stores the instruction in the corresponding instruction fetch buffer. In some embodiments, each core 101 may include one or more coprocessors to off-load a main execution unit in each core 101. Examples of suitable coprocessors include, for example, floating point units, encryption coprocessors, or digital signal processing engines. Subsets of the ISA may be directed towards an appropriate coprocessor rather than be executed by the execution unit, allowing the execution unit to process other instructions in the ISA.

System bus 110 may be configured to manage data flow between cores 101*a-h* and other circuits in processor 100, such as, e.g., clock sources 120*a-d*, PMUs 150*a-d*, and other circuits not shown. In one embodiment, system bus 110 may include logic, such as multiplexers or a switch fabric, for example. In some embodiments, system bus 110 may include logic to queue data requests and/or responses, such that requests and responses may not block other activity while waiting for service. It is noted that in various embodiments, system bus 110 may be implemented using any suitable type of interconnect network.

Cores 101*a-h* may be organized into groups, with the cores of each group physically co-located to share resources such as locally distributed power supply signals and clock signals. In the illustrated embodiment, cores 101*a-h* may be segmented into groups of two such that each group of cores may occupy roughly one quadrant of an integrated circuit (IC). Each quadrant includes a respective clock source 120*a-d*, temp sensor 140*a-d*, and PMU 150*a-d*.

In the present embodiment, clock sources 120*a-d* provide one or more clock signals for the cores 101*a-h* in the respective quadrant. For example, clock source 120*a* supplies clock signals for cores 101*a* and 101*b*, clock source 120*b* supplies clock signals for cores 101*c* and 101*d*, and so forth. Each clock source 120*a-d* may provide a clock signal with a same frequency to each of the coupled cores 101, or may be capable of providing independent clock signals to each coupled core 101. Clock signal frequencies may be adjusted through use of local clock divider circuits or by selecting from multiple clock signals through switches or multiplexors.

Temperature sensors (or simply "temp sensors") 140*a-d*, in the present embodiment, monitor one or more junction temperatures in their respective quadrant. Each temp sensor 140*a-d* includes circuits for measuring a voltage output from one or more temperature sensing elements, such as, for example, thermal diodes, or thermistors. Each temp sensor 140*a-d* may be coupled to one or more thermal diodes located in various locations throughout the corresponding quadrant of the IC. Monitoring may be continuous, periodic, or in response to a control signal asserted by a given core of cores 101*a-h*.

In the illustrated embodiment, PMUs 150a-d control local distribution of power supply signals within each corresponding quadrant. PMUs 150a-d control voltage levels of one or more power supply signals to the cores 101 in the corresponding quadrant. Voltage levels may be adjusted by use of voltage regulating circuits or by selecting from multiple power supply signals through switches or multiplexors. PMUs 150a-d receive commands to adjust voltage levels from other components in processor 100, such as from one of cores 101a-h or from a corresponding temperature sensing unit 140a-d. In some embodiments, PMUs 150a-d may include circuitry for measuring a current passing through a given power supply signal, thereby providing a capability to determine an amount of power consumed by circuits receiving the given power supply signal.

It is noted that FIG. 1 is merely an example of a multicore processor. In other embodiments, processor 100 may include one or more levels of cache memory as well as network interfaces. The physical structure may not be represented by FIG. 1 as many. The organization of FIG. 1 is intended to represent a logical organization of circuits rather than a physical organization, and, in various embodiments, other components may also be employed. Other physical arrangements, therefore, are possible and contemplated.

Figure 2:
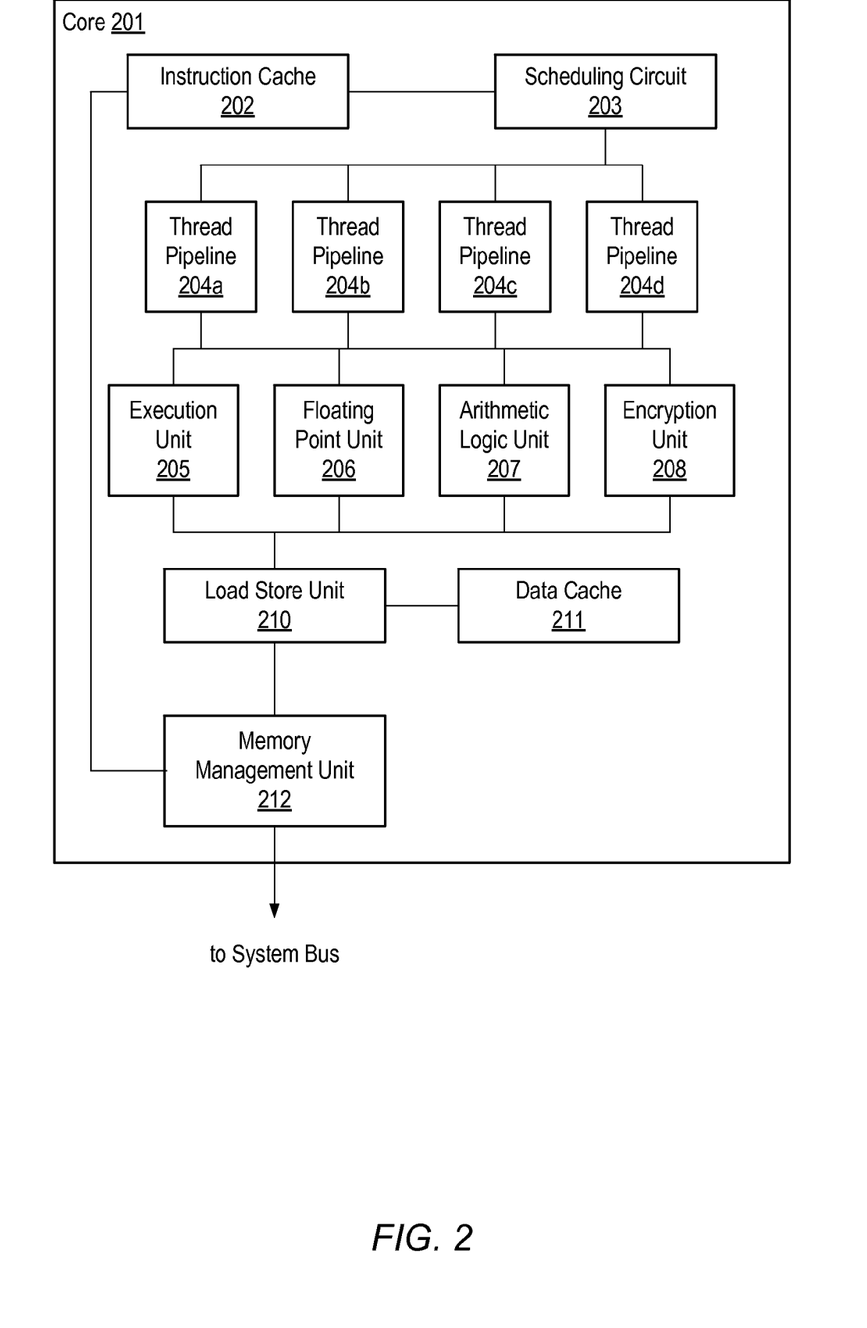
FIG. 2 illustrates a block diagram of an embodiment of a core with multiple sub-circuits.

Turning to FIG. 2, a block diagram of an embodiment of a core with multiple sub-circuits is shown. In the present embodiment, core 201 corresponds to one of cores 101a-h in processor 100 in FIG. 1. In other embodiments, core 201 may be implemented in various single and multiple core microprocessors, microcontrollers, or systems-on-a-chip. Core 201 includes instruction cache 202, coupled to memory management unit (MMU) 212, and scheduling circuit 203. Thread pipelines 204a-d are coupled to scheduling circuit 203, execution unit 205, floating point unit 206, arithmetic logic unit 207, and encryption unit 208. Execution unit 205 is further coupled to load store unit 210. Load store unit is coupled to data cache 211 as well as to memory management unit 212.

Instruction cache 202 may be configured to receive instructions for execution in core 201. In the illustrated embodiment, instruction cache 202 is configured to perform various operations relating to the requesting instructions from memories external to core 201, such as higher levels of cache memory or system memory. Instruction cache 202 includes a memory for storing instructions to be executed by circuits within core 201. In some embodiments, instruction cache 202 includes logic to maintain fetch addresses (e.g., derived from program counters) corresponding to each thread being executed by core 201, and to coordinate the retrieval of instructions from the instruction cache memory according to those fetch addresses. In one embodiment, instruction cache 202 is configured to maintain a pool of fetched, ready-for-issue instructions drawn from among each of the threads being executed by core 201.

Scheduling circuit 203 may be configured to organize instructions for execution in core 201. In the illustrated embodiment, scheduling circuit 203 is configured to select instructions for various threads from instruction cache 202 and move the selected instructions into respective thread pipelines 204a-d. In some embodiments, scheduling circuit 203 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups). In some embodiments, scheduling circuit 203 may be configured to further prepare instructions for execution, for example by detecting scheduling hazards, arbitrating for access to contended resources, or the like.

In the present embodiment, core 201 is capable of multi-threaded operation. To organize and track execution of independent execution threads, instructions related to a common thread are stored in one or more buffers or queues, collectively referred to herein as an "instruction pipeline," or simply "pipeline." Core 201 includes four such pipelines, denoted as thread pipeline 204a-d. Each thread pipeline 204 includes one or more buffers for storing instructions related to a given thread. In some embodiments, thread pipelines 204 may each include respective memory or register circuits for physically storing the instructions. In other embodiments, two or more thread pipelines 204 may share a common memory for storing each thread's instructions, with instructions for a given thread being identified by tags or organized into separate data structures within the common memory. Instructions in each thread pipeline are sent to respective processing units (execution unit 205, floating point unit 206, arithmetic logic unit 207, and encryption unit 208) as determined by scheduling circuit 203.

Execution unit 205, in the illustrated embodiment, processes and provides results for certain types of instructions issued from scheduling circuit 203 via thread pipelines 204. In one embodiment, execution unit 205 may be configured to execute certain integer-type instructions defined in the implemented ISA, such as arithmetic, logical, and shift instructions. It is contemplated that in some embodiments, core 201 may include more than one execution unit 205, and each of the execution units may or may not be symmetric in functionality. Each execution unit 205 may be capable of processing one or more threads. In the illustrated embodiment, instructions destined for floating point unit 206 or arithmetic logic unit 207 may be issued directly from thread pipelines 204 to their respective units without passing through execution unit 205. In alternative embodiments, however, it is contemplated that such instructions may pass through execution unit 205 before being received at their respective units.

In the illustrated embodiment, floating point unit 206 receives and processes floating point type instructions. Floating point unit 206 implements single-precision and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions.

Arithmetic logic unit 207 may be configured to execute and provide results for certain arithmetic instructions defined in the implemented ISA. For example, in one embodiment, arithmetic logic unit 207 implements integer arithmetic instructions, such as add, subtract, multiply, divide, and population count instructions. In one embodiment, arithmetic logic unit 207 implements separate processing pipelines for integer add/multiply, divide, and Boolean operations, while in other embodiments the instructions implemented by arithmetic logic unit 207 may be differently partitioned.

Encryption unit 208 may be configured to implement one or more specific data processing algorithms in hardware. For example, encryption unit 208 may include logic configured to support encryption/decryption algorithms. In some embodiments, encryption unit 208 may also include logic to implement hash or checksum algorithms. Encryption unit 208 may be configured to implement modular arithmetic such as modular multiplication, reduction and exponentiation. In one embodiment, for example, encryption unit 208 is configured to utilize the arithmetic functions included in arithmetic logic unit 207.

Load store unit 210 may be configured to process data memory references, such as integer and floating-point load and store instructions as well as memory requests that may originate from other blocks within core 201, such as encryption unit 208, for example. Load store unit 210 is coupled to data cache 211 for storage of data values corresponding to frequently accessed memory locations, and includes logic configured to detect cache misses and to responsively request data from another memory via memory management unit 212. Additionally, in some embodiments load store unit 210 includes logic configured to translate virtual data addresses generated by a processing unit, such as, e.g., execution unit 205, to physical addresses.

A number of functional units in the illustrated embodiment of core 201 may be configured to generate memory or I/O requests external to core 201. For example, instruction cache 202 or load store unit 210 may generate access requests to a higher level cache or system memory in response to their respective cache misses. In the illustrated embodiment, memory management unit 212 provides a centralized interface to the system bus of processor 100 on behalf of the various functional units that may generate memory accesses. In one embodiment, memory management unit 212 is also configured to receive data returned via the system bus, and to direct such data to the appropriate functional unit (e.g., data cache 211 for a data cache fill due to miss). Memory management unit 212 may, in some embodiments, be coupled to other cores in a multicore processor. In the present embodiment, memory management unit 212 also manages one or more translation tables stored in system memory and traverses such tables in response to a request for an address translation from instruction cache 202 or load store unit 210. Memory management unit 212 is therefore capable of accessing memory external to core 201, such as higher level cache memories, or system memory external to processor 100.

The embodiment of the core illustrated in FIG. 2 is one of multiple contemplated examples. Other embodiments of a core may include a different number and configuration of components. For example, arithmetic logic unit 208 may be combined with floating point unit 206 in some embodiments.

Figure 3:
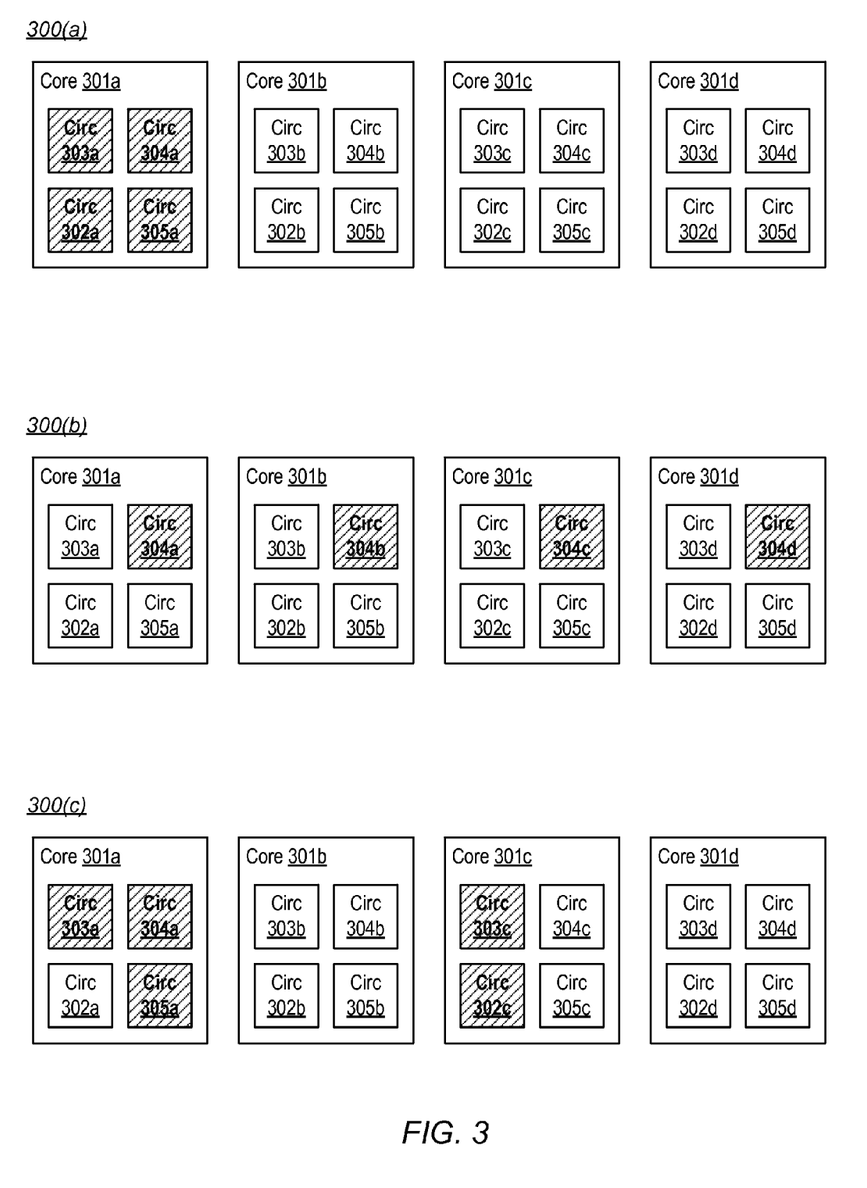
FIG. 3 includes three figures, 300(*a*), 300(*b*), and 300(*c*), each of which illustrates four cores from a multicore processor in various states of operation.

Moving to FIG. 3, three diagrams are shown, 300(a), 300(b), and 300(c), illustrating four cores 201a-d from a multicore processor in various states of operation. Each core includes a respective set of sub-circuits 302a-d through 305a-d. Each diagram 300(a-c) depicts activity of sub-circuits 302-305 within each of the four cores 301, with cross-hatched blocks indicating activity. In the present embodiment, each of cores 301a-d corresponds to core 201 as illustrated in FIG. 2.

In diagram 300(a), a single core, core 301a, of the four cores 301 includes simultaneously active sub-circuits. In the present embodiment, respective software processes are executed in core 301a designed to exercise each of the sub-circuits 302a-305a. In some embodiments, each sub-circuit 302a-305a may correspond to circuits associated with respective threads, such as, e.g., thread pipeline 204a-204d. In other embodiments, each sub-circuit 302a-305a may correspond to respective processing units such as, for example, execution unit 205, floating point unit 206, arithmetic unit 207, and encryption unit 208. While each sub-circuit 302a-305a is active, at least one performance parameter is monitored, such as, a frequency of a core clock signal used by each sub-circuit 302a-305a, measurements from a respective temperature sensor located nearest each sub-circuit 302a-305a, or a rate of instruction execution by each sub-circuit 302a-305a. The clock signal frequencies and the rates of instruction execution may indicate how quickly and/or efficiently each sub-circuit 302a-305a is capable of executing its respective software process. The measurements from the temperature sensor may be indicative of an amount of power the sub-circuits 302a-305a consume during execution of the software processes. A respective test value is determined based on the at least one performance parameter for each sub-circuit 302a-305a. The tests and measurements may be repeated for each of cores 301b-d, generating a set of test values for each sub-circuit 302-305 in each core 301.

In diagram 300(b), one respective sub-circuit 304a-d in each core 301a-d is active at the same time. In the illustrated embodiment, software processes are executed that exercise one target sub-circuit in each core 301a-d, sub-circuit 304a-d. Similar to the description of diagram 300(a), one or more performance parameters are monitored during the activity of each sub-circuit 304a-d. A frequency of a core clock signal, a measurement of a temperature sensor, and a measurement of a supply current are example parameters that may be monitored. Respective test values are determined corresponding to each sub-circuit 304a-d. Again, the tests and measurements may be repeated for other sub-circuit in each core 301a-d, generating a respective test value for each sub-circuit 302-305 in each core 301.

Referring to diagram 300(c), three sub-circuits (303a, 304a, and 305a) in core 301a and two sub-circuits (302c and 303c) in core 301c are active. At the same time, cores 301b and 301d are inactive. In the present embodiment, performance parameters are measured for each of the active sub-circuits (303a, 304a, 305a, 302c, and 303c) in the two active cores 301a and 301c. Respective test values are determined based on the measured parameters for one or more of the active sub-circuits. Any suitable combination of sub-circuits and cores may be tested.

In some embodiments, although more than one sub-circuit is active, measurements may not be taken on all active sub-circuits. For example, in diagram 300(c), although sub-circuits 303, 304, and 305 of cores 310a and 301c are active, measurements may only be taken on sub-circuits 304a and 304c. Activity in the other active sub-circuits 303 and 305 may be used to support sub-circuits 304a and 304c, or to place additional stress on sub-circuits 304a and 304c to test the limits of their performance.

Upon completion of testing, one or more test values are collected for each tested sub-circuit 302-305. These test values may be used to determine if a core design achieved the design targets, how one type of core design performs compared to another type of core design, indicate if a core has degraded performance compared to other cores, or if one or more cores in a given multicore processor are defective.

It is noted that although specific sub-circuits are denoted as being active at a given time, other circuits in a given core may include some level of activity. In some embodiments, a software processes to activate a predetermined sub-circuit may require at least some level of activity of other sub-circuits in order to execute the software process. It is contemplated, however, that activity in the non-targeted sub-circuits may be kept at a lower level that of the targeted sub-circuit, such that the performance parameters being monitored primarily reflect the operation of the targeted sub-circuit.

It is also noted that the activity diagrams of FIG. 3 is a simplified example for demonstrating the disclosed concepts. Any suitable number of cores may be active at a given time as well as any suitable number of sub-circuits in each core.

Figure 4:
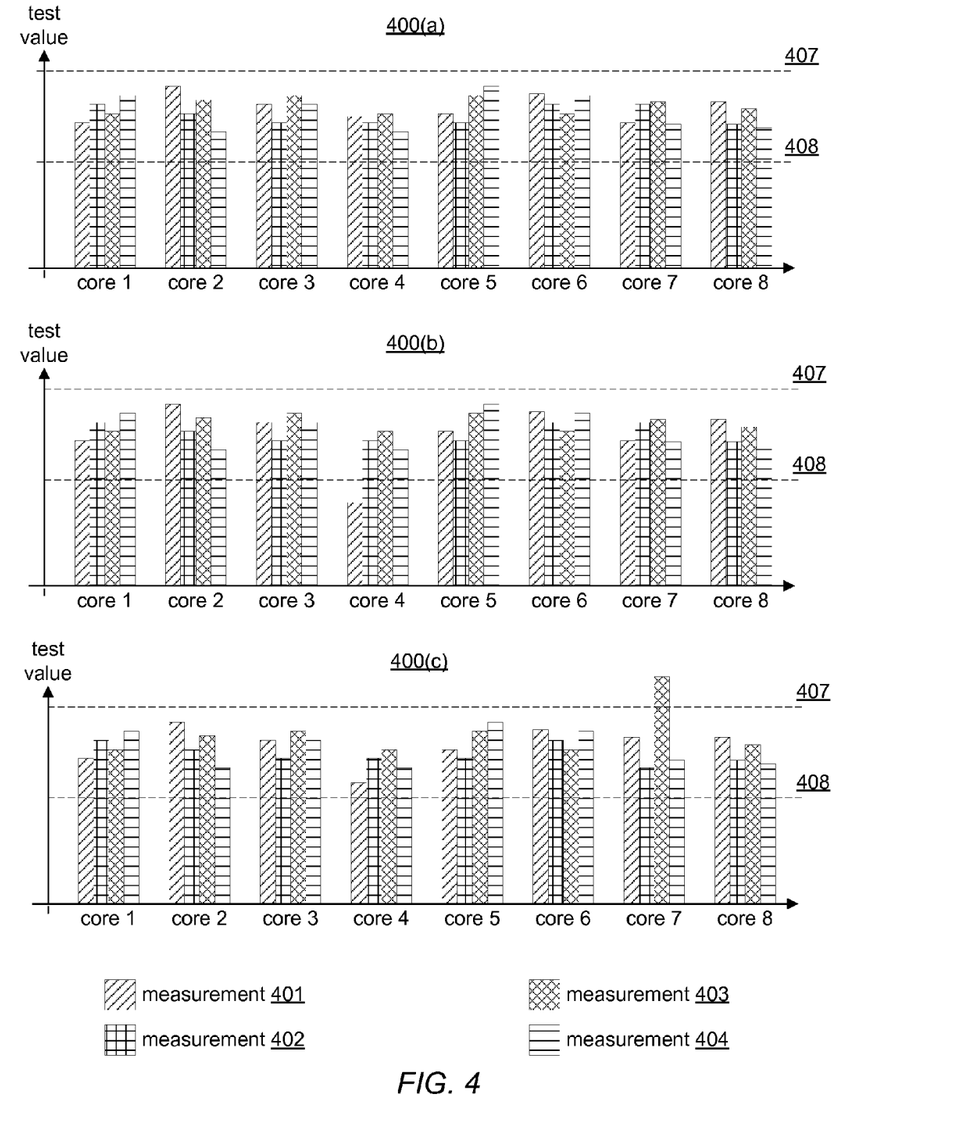
FIG. 4 includes three charts, 400(*a*), 400(*b*), and 400(*c*), each of which shows performance of sub-circuits in each of eight cores of a multicore processor.

Turning to FIG. 4, three charts, 400(*a*), 400(*b*), and 400(*c*), each show example performance measurements of sub-circuits in each of eight cores of a multicore processor. The eight cores may correspond to any suitable core, such as, for example, core 201 in FIG. 2. Each bar chart 400 includes four performance measurements for each of the eight cores, measurements 401 through 404. Two threshold values are also shown on each bar chart, upper value 407 and lower value 408.

Chart 400(*a*) illustrates an example of performance measurements from a processor in which all eight cores may be determined to be functioning within acceptable tolerances. As illustrated, all four performance measurements 401-404 for each of the eight cores fall between upper value 407 and lower value 408. Each performance measurement 401-404 may be related to a specific sub-circuit. For example, measurement 401 may correspond to a frequency of a clock signal used by execution unit 205 and measurement 403 may correspond to a temperature reading measured during operation of arithmetic logic unit 207. Some performance measurements 401-404 may be judged only against lower value 408 or upper value 407, while other may be judged against both threshold values. Two threshold values for all four performance measurements are shown for clarity. In other embodiments, each performance measurement 401-404 may be judged against its own threshold limits.

Chart 400(*b*) shows an example of performance measurements from a processor in which core 4 includes one measurement that is less than lower value 408. Measurement 401 for core 4 is shown to be less than lower limit 408, indicating degraded performance in comparison to the other cores. The degraded performance may indicate that the corresponding sub-circuit in core 4 is defective, that configuration values used by core 4 are incorrect, or that the design of core 4 is unacceptable. If the measurements of chart 400(*b*) correspond to a production test measurements, then the multicore processor may be rejected as a test failure in response to measurement 401 of core 4 not exceeding lower value 408. If the measurement of chart 400(*b*) corresponds to an evaluation of a new or revised design for the multicore processor, then the design of core 4 and/or its associated circuits may be revised to improve the sub-circuit corresponding to measurement 401. Continuing the example from chart 400(*a*), if measurement 401 corresponds to the frequency of a clock signal used by execution unit 205, then this failure of core 4 may indicate that execution unit 205 of core 4 has a manufacturing defect, has been configured incorrectly, or may require a design fix to improve performance.

In chart 400(*c*), measurement 403 of core 7 is shown to exceed upper value 407. Continuing the example from chart 400(*a*), measurement 403 may correspond to a temperature associated with operation of arithmetic logic unit 207. An elevated temperature may indicate a higher power consumption of the arithmetic logic unit 207 of core 7, and thereby degraded performance compared to the arithmetic logic units of the other cores. This higher power consumption may be associated with a manufacturing defect, an improper configuration, or a design flaw. Consequently, the multicore processor may be rejected in a production test operation or may be redesigned or reconfigured to improve the power consumption of circuits associated with the arithmetic logic unit 207 of core 7.

In some embodiments, upper value 407 and/or lower value 408 may be dynamically determined. For example, upper value 407 may correspond to an average or mean value of a given performance measurement from each of the eight cores plus a delta of one or more standard deviations. An unacceptable core may be indicated by a respective performance measurement exceeding the mean value plus the delta.

It is noted that the bar charts of FIG. 4 are merely examples for demonstrative purposes. Although four performance measurements are shown for each of the eight cores, in other embodiments, any suitable number of measurements or number of cores may be included. Additionally, any suitable number of threshold values may be used for each of the performance measurements.

Figure 5:
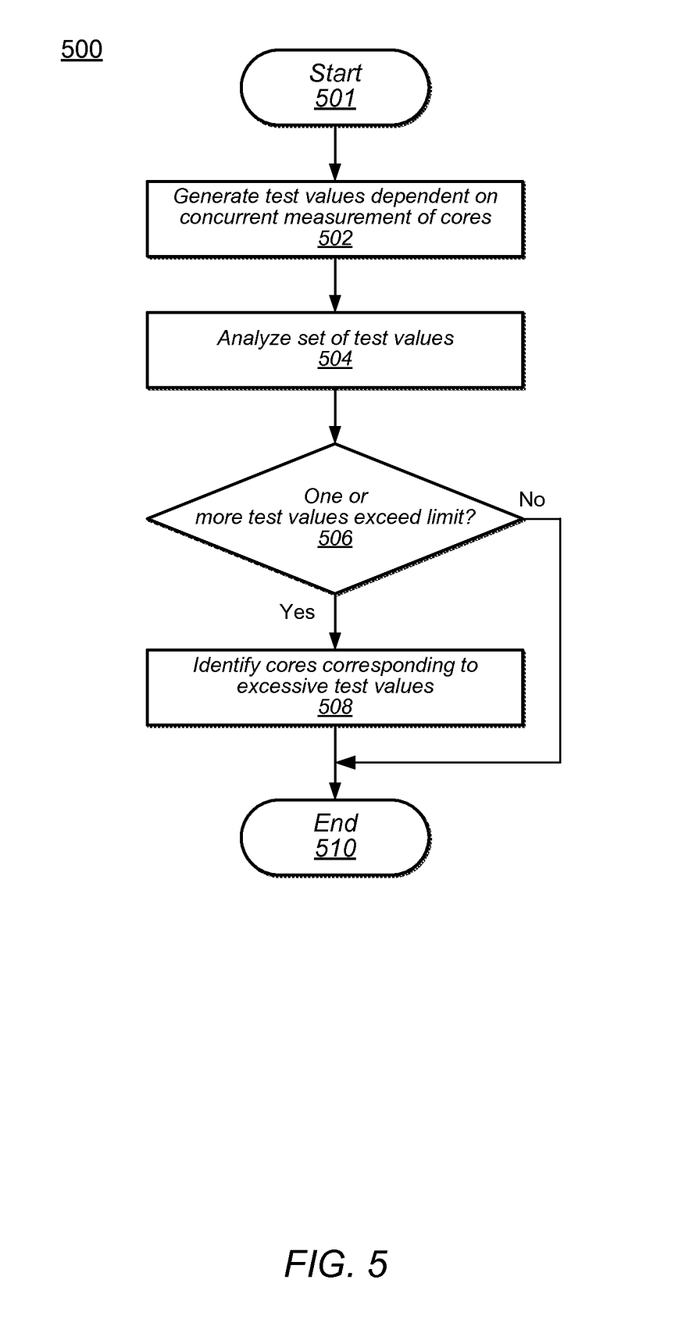
FIG. 5 is an illustration of a flow diagram depicting an embodiment of a method for measuring performance of cores in a multicore processor.

Moving now to FIG. 5, an embodiment of a method for measuring performance of cores in a multicore processor is illustrated. Method 500 of FIG. 5 may be applicable to a multicore processor such as processor 100 of FIG. 1. Method 500 may be utilized in a manufacturing test process or a device evaluation or benchmarking procedure. Referring collectively to processor 100 and the flow diagram of FIG. 5, method 500 may begin in block 501.

A set of test values is generated from concurrent measurements on one or more of cores 101 in processor 100 (block 502). In the present embodiment, each of the concurrent measurements is performed on a sub-circuit of a respective core 101. For example, each of cores 101 may correspond to core 201 in FIG. 2. Each of the concurrent measurements may correspond to a portion of a core, such as, e.g., one of thread pipelines 204, execution unit 205, or memory management unit 212. In some embodiments, more than one sub-circuit of a single core 101 may be exercised concurrently. In other embodiments, a single sub-circuit in each of cores 101 may be exercised concurrently, or any combination thereof. Measurements are grouped into one or more sets of test values.

It is noted, that as used herein, "concurrent" refers to executing two or more instructions or performing two or more measurements at the same time. Concurrent measurements may or may not start and/or end synchronously. Timing overlaps, however, for at least a portion of the actions involved in performing the measurements. For example, two concurrent temperature measurements may be performed by initiating a first temperature measurement at a first time and a second measurement at a second time, later than the first time. The first measurement may end at a third time, after the second time, and the second measurement may end after the third time. Similarly, concurrent execution of instructions is not intended to imply that the instructions begin and end on a same clock cycle, but rather that the concurrently executed instructions overlap processing time for at least a portion of the overall execution time. For example, a software process for exercising a floating point unit may be started in two cores with the first process beginning one or more clock cycles before the second process. The two processes actively execute one or more instructions at a same time and then end on respective clock cycles.

Each test value of a given set of test values is analyzed (block 504). In some embodiments, analysis of a given test value may include comparing it to one or more threshold values. In other embodiments, each test value may be compared to the other test values in the test value set or to an average or mean of the test values in the test value set.

Further operations of the method depend on a determination if one or more test values exceed a limit (block 506). Depending on the type of performance measurement used to generate a test value of the test value set, exceeding a limit may comprise the test value being greater than or less than a set limit or a calculated average or mean value. For example, a given test value corresponding to a frequency of a clock signal used by arithmetic logic unit 207 in core 101b may be compared to similar test values corresponding to the other cores 101. If the given test value is less than an average of the similar test values for all cores by more than a fixed delta or a number of calculated standard deviations, then the given test value may be identified as unacceptable or out of range. If one or more test values exceed a determined limit, then the method moves to block 508. Otherwise, the method ends in block 510.

Cores corresponding to test values that are determined to exceed a limit are identified (block 508). For all test values determined to exceed a limit, the core from which the respective test value was measured is identified. In some embodiments, sub-circuits corresponding to unacceptable test values are identified. If multiple sub-circuits in a given core are identified, then a defect in the core may be identified. A similar sub-circuit, e.g., encryption unit 208, identified in multiple cores may indicate a design flaw in encryption unit 208. The method ends in block 510.

Method 500 of FIG. 5 is merely an example. Although the operations illustrated in method 500 are depicted as being performed in a sequential fashion, in other embodiments, some of the operations may be performed in parallel or in a different sequence. The method may be repeated to generate any suitable number of test value sets.

Figure 6:
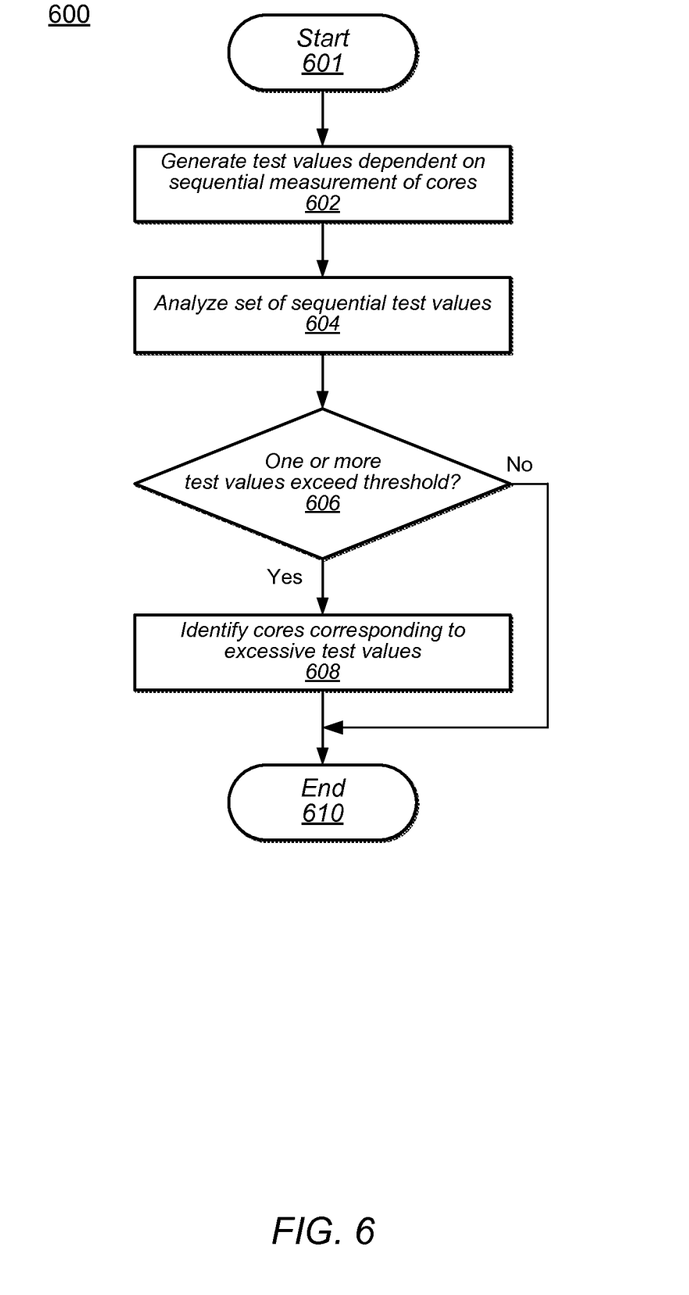
FIG. 6 shows a flow diagram illustrating another embodiment of a method for measuring performance of cores in a multicore processor.

Turning now to FIG. 6, another embodiment of a method for measuring performance of sub-circuits of cores in a multicore processor is shown. Method 600 may be applicable to a processor such as processor 100 in FIG. 1. As described for method 500 above, method 600 may be utilized in a manufacturing test process. Referring collectively to processor 100 and the flowchart of FIG. 6, method 600 begins in block 601.

Performance measurements on one or more of cores 101 are made sequentially to generate corresponding test values (block 602). In the present embodiment, performance measurements are made that are similar to those measurements made in method 500 in FIG. 5. In contrast to method 500, the performance measurements of method 600 are made sequentially rather than concurrently. Each of the sequential measurements is performed on a sub-circuit of a respective core 101, such as described in method 500. By making the performance measurements sequentially, the overall workload of the individual core 101 or the processor as a whole may be lowered than when performing the measurements concurrently, providing an alternative measurement for comparison. The measurements are grouped into one or more sets of sequential test values.

A set of sequential test values is analyzed (block 604). The test values measured sequentially are compared to corresponding test values measured concurrently using method 500 or a similar method. In addition to comparing the sequential test values to corresponding concurrent test values, similar sequential test values may be compared from different cores 101. For example, given concurrent test values may correspond to temperature measurements generated from each of temperature sensors 140 while encryption units in each of cores 101 are active. Respective sequential test values may correspond to temperature measurements generated from each of temperature sensors 140 while an encryption unit from a nearby core 101 is active (e.g., temperature sensor 140a is measured while the encryption units in cores 101a or 101b are active). The concurrent temperature measurement associated with core 101a may be compared to the sequential temperature measurement corresponding to core 101a.

Further operations of method 600 depend on the sequential test values (block 606). The sequential test values are compared to concurrent test values and a determination is made of one or more of the comparisons results in a difference greater than a predetermined threshold. This predetermined threshold may correspond to a fixed value or may be determined dynamically based on other test values. Continuing the example from block 604, if the two temperature measurements differ by more than a threshold amount, then the temperature measurements may be unacceptable or out of range. If one or more of the sequential test values are determined to be out of range, then the method moves to block 608 to identify a corresponding core 101. Otherwise, the method ends in block 610.

Cores corresponding to sequential test values that are determined to differ from corresponding concurrent test values are identified (block 608). For all sequential test values determined to be unacceptable, the core from which the respective sequential test value was measured is identified. In some embodiments, one or more sub-circuits corresponding to unacceptable test values are identified in addition to identifying the corresponding core 101. The method ends in block 610.

The method of FIG. 6 is an example method for demonstrating disclosed concepts. In some embodiments, some of the operations illustrated in method 600 may be performed in a different sequence or in parallel. Similar to method 500, method 600 may be repeated a suitable number of times.

Figure 7:
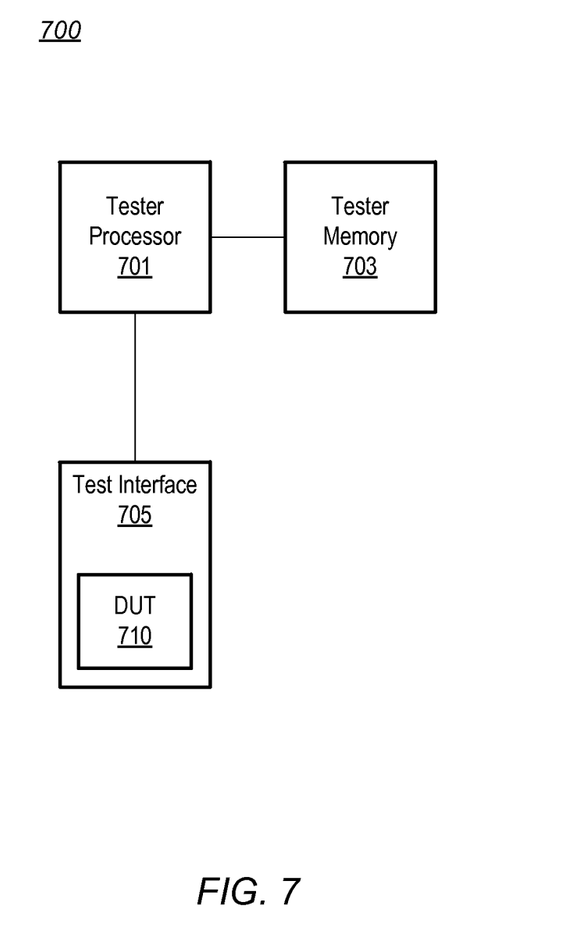
FIG. 7 shows a block diagram an embodiment of an IC testing system.

Moving to FIG. 7, a block diagram of an embodiment of an IC testing system is illustrated. IC tester 700 includes tester processor 701 coupled to tester memory 703, and to test interface 705. A device under test (DUT) 710 is coupled to test interface 705. IC tester 700 may implement a testing method, such as, for example, method 500 of FIG. 5 and/or method 600 of FIG. 6.

Tester processor 701 executes and controls a test process for determining if DUT 710 is an acceptable device to sell or use in a larger product, or if DUT 710 is defective and should be rejected. Tester processor 701 may correspond to a general purpose processor, an application specific integrated circuit (ASIC), a programmable logic array (PLA), or any suitable device capable of executing instructions of a test program. In the illustrated embodiment, tester processor 701 executes a test program stored in tester memory 703.

Tester memory 703 stores one or more test programs and associated test patterns for generating input stimuli and expected output values. Tester memory 703 may include a non-transitory, computer accessible storage medium for storing instructions of a test program. The test programs and/or test patterns may include instructions to be executed on one or more cores in DUT 710 as part of the testing process. In some embodiments, tester memory may include a combination of volatile and non-volatile memory for storing test programs and test patterns. In other embodiments, tester memory may include just volatile memory and test programs and vectors are copied into test memory 703 before DUT 710 is tested. In addition to the test program and test vectors, other data associated with testing DUT 710 is stored in test memory 703, including values and measurements from DUT 710, such as, for example, calibration values for temperature sensing units.

In the present embodiment, test interface 705 provides an electrical connection to the pins or terminals of DUT 710. Test interface 705 includes any suitable number of relays, power supplies, clock sources, analog and/or digital signal generators, and analog and/or digital comparators. Execution of commands in the test program causes tester processor 701 to send commands to test interface 705 resulting in appropriate stimuli to be applied to DUT 710 and enabling monitoring of outputs from DUT 710 resulting from the stimuli. One form of stimuli may include instructions for execution in one or more cores in DUT 710 to exercise sub-circuits within the one or more cores. Comparison of the outputs to expected outputs as indicated by the test vectors may determine if a given DUT 710 passes or fails the test program.

It is noted that IC tester 700 of FIG. 7 is merely an example. In various embodiments, an IC testing system may have more components than illustrated. For example, embodiments of IC tester 700 may additionally include displays and user input devices such as keyboards and mice, used to select a test program for a given type of DUT 710.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system, comprising:
   an interface configured to communicate to a device under test (DUT), wherein the DUT includes a plurality of processor cores; and
   a testing apparatus configured to:
   generate input stimuli that causes the DUT to activate a particular portion of each processor core of the plurality of processor cores, wherein the input stimuli correspond to a particular set of instructions executed by each of the particular portions;
   measure a rate at which each particular portion executes the particular set of instructions;
   generate a first set of test values, the test values being based on a respective one of the measured rates, wherein each test value of the first set corresponds to a given processor core of the plurality of processor cores;
   determine a first threshold based on a standard deviation of the first set of test values; and
   reject the DUT in response to a determination that the DUT is defective based on at least one test value of the first set of test values being less than the first threshold.

2. The system of claim 1, wherein each processor core of the plurality of processor cores includes a plurality of execution circuits, and wherein the particular portion of each processor core includes a respective execution circuit of the plurality of execution circuits.

3. The system of claim 2, wherein to concurrently measure the rate at which each particular portion of each processor core executes the particular set of instructions, the testing apparatus is further configured to concurrently measure a rate at which each of at least two execution circuits in a given processor core execute the particular set of instructions.

4. The system of claim 1, wherein the testing apparatus is further configured to:
   measure a temperature corresponding to the particular portion of each processor core to generate a second set of test values;
   determine a second threshold based on a standard deviation of the second set of test values; and
   reject the DUT in response to a determination that the DUT is defective based on at least one test value of the second set of test values is greater than the second threshold.

5. The system of claim 1, wherein to determine the first threshold, the testing apparatus is further configured to add a multiple of the standard deviation to a mean value.

6. The system of claim 4, wherein the testing apparatus is further configured to compare each test value of the second set of test values to a corresponding test value of the first set of test values.

7. The system of claim 1, wherein to measure the rate at which each particular each processor core the articular set of instructions, the testing apparatus is further configured to activate a different portion of at least one processor core of the plurality of processor cores.

8. A method comprising:
   generating input stimuli that causes a processor to activate a particular portion of each core of a plurality of cores included in the processor, wherein the input stimuli correspond to a particular set of instructions executed by each of the particular portions;
   measuring a rate at which each particular portion executes the particular set of instructions;
   generating a first set of test values, the test values being based on a respective one of the measured rates, wherein each test value of the first set of test values corresponds to a given core of the plurality of cores;
   determining a first threshold based on a standard deviation value of the first set of test values; and
   rejecting the processor in response to a determination that the processor is defective based on at least one test value being less than the first threshold.

9. The method of claim 8, wherein each core of the plurality of cores includes a plurality of execution circuits, and wherein the particular portion of each core includes a respective execution circuit of the plurality of execution circuits.

10. The method of claim 9, wherein concurrently measuring the rate at which each particular portion of each core executes the particular set of instructions comprises concurrently measuring a rate at which each of at least two execution circuits in a respective core execute the particular set of instructions.

11. The method of claim 8, further comprising:
measuring a temperature corresponding to the particular portion of each core to generate a second set of test values;
determining a second threshold based on a standard deviation of the second set of test values; and
rejecting the processor in response to a determination that the processor is defective based on at least one test value of the second set of test values is greater than the second threshold.

12. The method of claim 8, further comprising:
measuring a frequency of a clock signal corresponding to the particular portion of each core to generate a second set of test values;
determining a second threshold based on a standard deviation of the second set of test values; and
rejecting the processor in response to a determination that the processor is defective based on at least one test value of the second set of test values is greater than the second threshold.

13. The method of claim 8, further comprising determining the first threshold by adding a mean value to a multiple of the standard deviation value.

14. The method of claim 8, wherein concurrently measuring the rate at which each particular portion of each processor core executes the particular set of instructions comprises activating a different portion of at least one processor core of the plurality of cores.

15. A non-transitory, computer accessible storage medium having program instructions stored therein that, in response to execution by a computer system, causes the computer system to perform operations comprising:
generating input stimuli that causes a processor to activate a particular portion of each core of a plurality of cores included in the processor, wherein the input stimuli correspond to a particular set of instructions executed by each of the particular portions;
measuring a rate at which each particular portion executes the particular set of instructions;
generating a first set of test values, the test values being based on a respective one of the measured rates, wherein each test value of the first set corresponds to a given core of the plurality of cores;
determining a first threshold based on a standard deviation of the first set of test values; and
rejecting the processor in response to a determination that the processor is defective based on at least one test value being less than the first threshold.

16. The non-transitory, computer accessible storage medium of claim 15, further comprising sequentially measuring a temperature corresponding to the particular portion of each core to generate a second set of test values.

17. The non-transitory, computer accessible storage medium of claim 16, further comprising comparing each test value of the second set of test values to a corresponding test value of the first set of test values.

18. The non-transitory, computer accessible storage medium of claim 17, further comprising rejecting the processor in response to a determination that at least one test value of the second set of test values differs from the corresponding test value of the first set of test values by an amount greater than a second threshold.

19. The non-transitory, computer accessible storage medium of claim 15, wherein concurrently measuring the rate at which each particular portion of each processor core executes the particular set of instructions comprises activating a different portion of at least one processor core of the plurality of cores.

20. The non-transitory, computer accessible storage medium of claim 15, further comprising:
measuring a frequency of a clock signal corresponding to the particular portion of each core to generate a second set of test values;
determining a second threshold based on a standard deviation of the second set of test values; and
rejecting the processor in response to a determination that the processor is defective based on at least one test value of the second set of test values is greater than the second threshold.

* * * * *

UNITED STATES PATENT AND TRADEMARK OFFICE
CERTIFICATE OF CORRECTION

PATENT NO. : 9,983,966 B2
APPLICATION NO. : 14/953491
DATED : May 29, 2018
INVENTOR(S) : Parikh Page 1 of 1

It is certified that error appears in the above-identified patent and that said Letters Patent is hereby corrected as shown below:

In the Claims

In Column 14, Line 36, delete "particular each processor core the articular set" and insert -- particular portion of each processor core executes the particular set --, therefor.

Signed and Sealed this
Fifth Day of February, 2019

Andrei Iancu
*Director of the United States Patent and Trademark Office*